(12) United States Patent
Fausak et al.

(10) Patent No.: US 10,382,521 B2
(45) Date of Patent: Aug. 13, 2019

(54) GATEWAY THAT ENABLES A BROWSER-BASED APPLICATION TO COMMUNICATE WITH A SERVER-SIDE APPLICATION USING A NON-BROWSER-COMPATIBLE PROTOCOL

(71) Applicant: Wyse Technology, L.L.C., San Jose, CA (US)

(72) Inventors: Andrew Fausak, San Jose, CA (US); Oleg Rombakh, Los Gatos, CA (US)

(73) Assignee: Wyse Technology, L.L.C., Santa Clara, CA (US)

( * ) Notice: Subject to any disclaimer, the term of this patent is extended or adjusted under 35 U.S.C. 154(b) by 316 days.

(21) Appl. No.: 14/968,486

(22) Filed: Dec. 14, 2015

(65) Prior Publication Data
US 2017/0171289 A1 Jun. 15, 2017

(51) Int. Cl.
*H04L 29/08* (2006.01)
*H04L 29/06* (2006.01)

(52) U.S. Cl.
CPC ............ *H04L 67/025* (2013.01); *H04L 69/08* (2013.01)

(58) Field of Classification Search
CPC .............................. H04L 67/025; H04L 69/08
USPC ....................................................... 709/203
See application file for complete search history.

(56) References Cited

U.S. PATENT DOCUMENTS

| | | | | |
|---|---|---|---|---|
| 8,140,610 B2* | 3/2012 | Abdo | ................... | G06F 9/4445 709/200 |
| 8,214,505 B2* | 7/2012 | Jagadeeswaran | ....... | H04L 67/02 709/203 |
| 2002/0038384 A1* | 3/2002 | Khan | ................ | G06F 17/30905 709/245 |
| 2003/0014499 A1* | 1/2003 | Mighdoll | .................. | G06F 8/65 709/217 |

(Continued)

OTHER PUBLICATIONS

Aderhold, Andreas, Yvonne Jung, Katarzyna Wilkosinska, and Dieter W. Feltner. "Distributed 3d model optimization for the web with the common implementation framework for online virtual museums." In Digital Heritage International Congress (DigitalHeritage), 2013, vol. 2, pp. 719-726. IEEE, 2013.*

*Primary Examiner* — Cheikh T Ndiaye
*Assistant Examiner* — Melaku Y Habtemariam
(74) *Attorney, Agent, or Firm* — Kirton McConkie; Brian Tucker

(57) ABSTRACT

A generic client engine can associate a transcoder process with a requested server-side application so that the transcoder process can act as an intermediary between the browser-based application and the server-side application. The transcoder process can be configured to communicate with the browser-based application using a browser-supported protocol. The transcoder process can be further configured to transcode between the browser-supported protocol and a protocol employed by the server-side application. In cases where a gateway service provides access to the server-side application, the transcoder process can also act as an intermediary between the browser-based application (Continued)

and the gateway service to transcode between the browser-supported protocol and a gateway protocol. In some cases, the transcoder process, and possibly the gateway service, can alternatively be located on the client device that hosts the browser-based application.

19 Claims, 10 Drawing Sheets

(56) References Cited

U.S. PATENT DOCUMENTS

| | | | | |
|---|---|---|---|---|
| 2008/0201457 | A1* | 8/2008 | London | H04L 29/06 709/222 |
| 2012/0151369 | A1* | 6/2012 | Kominac | H04L 67/02 715/740 |
| 2013/0325934 | A1* | 12/2013 | Fausak | H04L 29/0809 709/203 |

* cited by examiner

GATEWAY THAT ENABLES A BROWSER-BASED APPLICATION TO COMMUNICATE WITH A SERVER-SIDE APPLICATION USING A NON-BROWSER-COMPATIBLE PROTOCOL

CROSS-REFERENCE TO RELATED APPLICATIONS

N/A

BACKGROUND

Internet communications are primarily carried out using the internet protocol suite. Generally speaking, the internet protocol suite is a networking model that defines hierarchical layers that each perform a specific function to send and/or receive data. Typically, the layers include an application layer, a transport layer, an internet layer, and a link layer. When an application running on one computer desires to send data to an application on another computer, the sending application employs an application layer protocol (e.g., HTTP, WebSocket, SMTP, RDP, FTP, SSH, etc.) to structure the data in a format that the receiving application will understand. The application then passes this "application layer" data down to the transport layer which will further format the data. Typically, the transport layer employs the transmission control protocol (TCP) or the user datagram protocol (UDP) which create TCP or UDP packets containing the application layer data. These packets are then passed down to the internet layer which typically employs the internet protocol (IP) to encapsulate the TCP or UDP packets into IP packets. These IP packets are then passed down to the link layer which implements a link layer protocol to physically transport the packets over the network to the intended recipient.

Because of the hierarchical structure of the internet protocol suite, in order for an application to communicate over the internet, the application only needs to be able to create appropriately formatted application layer data (e.g., SMTP formatted data if the application is an email client or server) and then send such data to the transport layer. Typically, the operating system provides an API to allow an application to create a socket (e.g., a TCP socket or UDP socket) over which the application can send application layer data to and receive application layer data from the underlying transport layer. Because of this abstraction, it can be relatively easy to create applications that can communicate with a remote application using any application layer protocol.

Recently, however, there has been a movement towards implementing applications that are browser-based. One reason for this movement is that most devices have a browser that provides a uniform environment (e.g., a JavaScript-based environment) in which the applications can run which is largely independent of the underlying operating system. In other words, it is now common to design applications to be run within the browser (hereinafter browser-based applications).

In addition to the ubiquitous nature of the browser, another benefit of browser-based applications is that they are executed in a sandbox. A sandbox is a controlled environment which restricts the application's access to potentially risky functionality of the underlying operating system. However, this added security also limits what a browser-based application can do. For example, it is not possible for a browser-based application (including a webpage) to directly access the transport layer. For example, an application written in JavaScript (which is the primarily language used to develop browser-based applications) cannot directly write to or read from a TCP or UDP socket. Instead, the application will be limited to using one of a few application layer protocols to send and receive data over the internet. For example, the application could employ HTTP GET or HTTP POST requests to transmit data to a remote server. Alternatively, the application could employ the WebSocket protocol.

FIG. 1 illustrates an example computing environment 100 in which a client device 101 having a browser 102 that executes a browser-based application 103 communicates via an internet connection 120 with an application 111 executing on a server 110. Because application 103 executes within browser 102, application 103 will be limited to the functionality provided by browser 102 including being limited to communicating with application 111 using only the application layer protocols supported by browser 102. If the application layer protocol employed by application 111 is not supported by browser 102, browser-based application 103 will not be able to communicate with application 111.

Accordingly, because of these limitations on the application layer protocols that are available for use by a browser-based application, or, in other words, because a browser-based application cannot directly communicate with the transport layer, many applications cannot be implemented as browser-based applications. For example, a remote desktop application, which may require use of the remote desktop protocol (or similar remote display protocol) to communicate with the server side application (e.g., a remote desktop server), cannot be implemented as a browser-based application since the remote desktop protocol is an application layer protocol that is not supported by the browser.

BRIEF SUMMARY

The present invention extends to methods, systems, and computer program products for enabling a browser-based application to communicate over the internet with a server-side application using a non-browser-compatible protocol. The present invention therefore allows many different types of applications that communicate over the internet to be executed within a browser.

To accomplish this, the present invention can provide a generic client engine that receives requests from browser-based applications to access server-side applications and in response creates an association or binding between the requested server-side application and a transcoder process that will act as an intermediary between the browser-based application and the server-side application. The transcoder process can be configured to communicate with the browser-based application using a browser-supported protocol. In some embodiments, the browser-supported protocol may initially be HTTP and then elevated to WebSocket. The transcoder process can be further configured to extract data received from the browser-based application and provide it to the server-side application in the manner expected by the server-side application. Similarly, the transcoder process can be configured to receive data from the server-side application in a manner that is transparent to the server-side application (e.g., by intercepting API calls to a transport layer socket). The transcoder process can then format the received data in accordance with the non-browser-supported protocol and send the formatted data to the browser-based application using the browser-supported protocol.

In environments where a gateway service is employed to provide access to the server-side application (i.e., when the server-side application is not hosted on the same server as the transcoder process), the transcoder process can act as an intermediary between the browser-based application and the gateway service to thereby transcode the browser-supported protocol to the protocol employed by the server-side application as well as the protocol employed by the gateway service. In some embodiments, the transcoder process and possibly the gateway service may be located on the client device.

In one embodiment, the present invention is implemented by a server as a method for enabling a browser-based application to employ a non-browser-supported protocol to communicate with an application. A request to access the application is received from the browser-based application. In response, an instance of a transcoder process is bound to the application. The transcoder process is configured to communicate with the browser-based application using a browser-supported protocol. One or more packets are received by the transcoder process by employing the browser-supported protocol. The data formatted in accordance with the non-browser-supported protocol is then extracted from the one or more packets. Then, the data is submitted to the server-side application.

In another embodiment, the present invention is implemented as a method performed by a first server for enabling a browser-based application to employ a non-browser-supported protocol to communicate with an application hosted on a second server for which the first server functions as a gateway. A request to access the application is received from the browser-based application. An instance of a transcoder process is bound to a gateway service hosted on the first server. The transcoder process is configured to communicate with the browser-based application using a browser-supported protocol. The transcoder process receives one or more packets from the browser-based application employing the browser-supported protocol. For each of the one or more packets, the transcoder process: (1) extracts data formatted in accordance with the non-browser-supported protocol; (2) appends one or more headers to the data, the one or more headers corresponding to a gateway protocol employed by the gateway service, the one or more headers being configured to cause the gateway service to forward one or more packets containing the data to the application hosted on the second server; and (3) submits the data with the appended one or more headers to the gateway service.

In another embodiment, the present invention is implemented as one or more computer storage media storing computer-executable instructions which when executed in a server environment implement a method for enabling a browser-based application to communicate with a remote display server that employs a remote display protocol for communicating over a network. A request to access the remote display server is received from the browser-based application. In response to the request, an instance of a transcoder process is bound to the remote display server. The transcoder process is configured to communicate with the browser-based application using a browser-supported protocol. The instance of the transcoder process receives one or more packets employing the browser-supported protocol from the browser-based application. The instance of the transcoder process extracts data formatted in accordance with the remote display protocol from the one or more packets and submits the data formatted in accordance with the remote display protocol to the remote display server. The instance of the transcode process receives data formatted in accordance with the remote display protocol from the remote display server, creates one or more packets formatted in accordance with the browser-supported protocol, and includes the data formatted in accordance with the remote display protocol within the one or more packets. The transcoder process then sends the one or more packets formatted in accordance with the browser-supported protocol to the browser-based application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
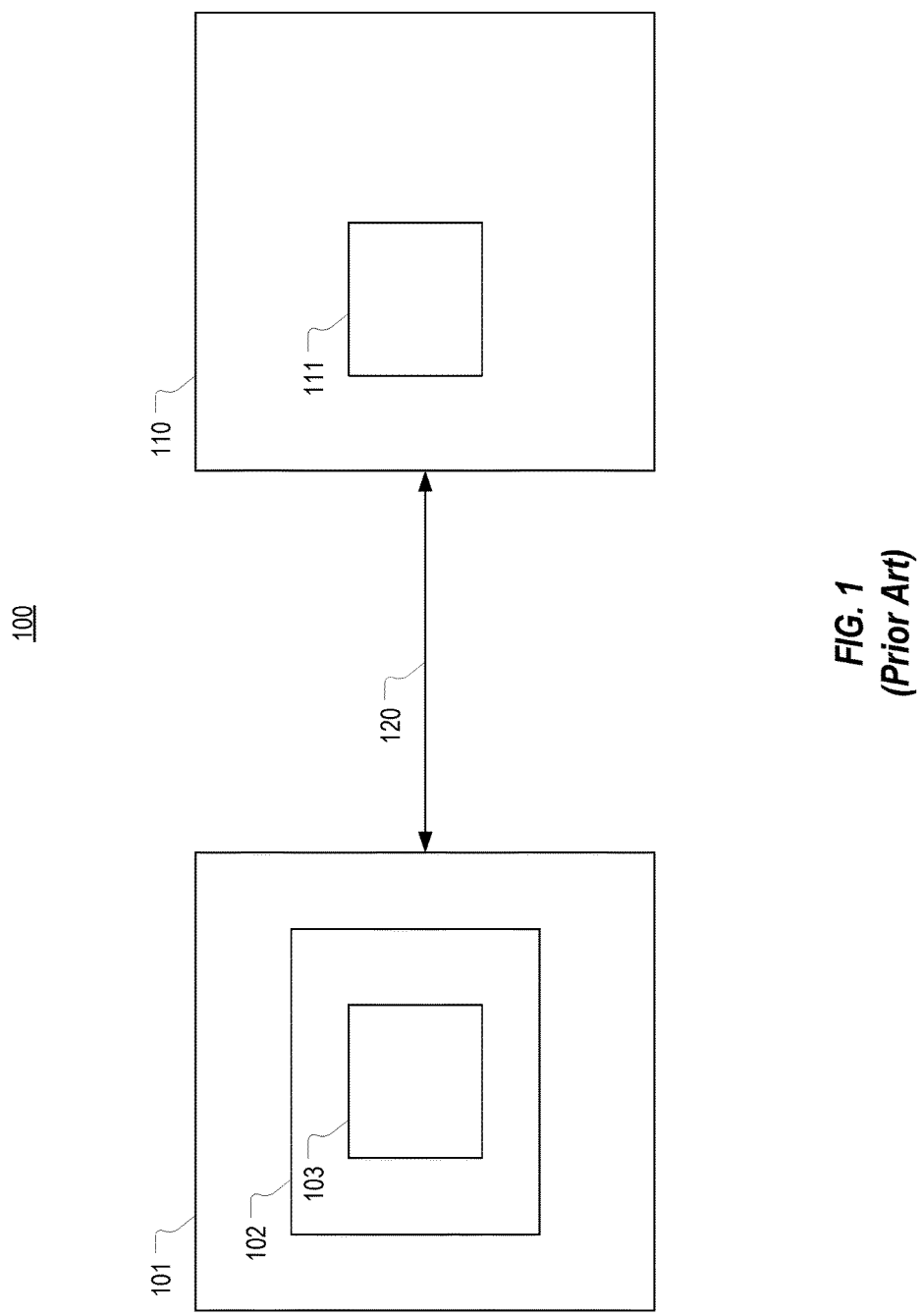
FIG. 1 illustrates a prior art computing environment which depicts how a browser-based application can communicate with a server-side application using only the application layer protocols supported by the browser.

To enable a browser-based application to communicate over the internet with a server-side application that employs a non-browser-compatible protocol, the present invention provides a generic client engine that functions as an intermediary between the browser-based application and the server-side application. In response to a request from the browser-based application to access a server-side application, the generic client engine can be configured to create a communication channel between a transcoder process and the browser-based application that employs an application layer protocol that is supported by the browser (e.g., the WebSocket protocol).

In this way, the browser-based application can be configured to transfer the application data that is formatted in accordance with the non-supported protocol using the supported protocol. For example, the browser-based application could send RDP formatted data (which is an application layer protocol) using the WebSocket protocol (which is a separate application layer protocol). In this case, the transcoder process would be configured to extract the RDP formatted data from the WebSocket packets and then provide the RDP formatted data to the server-side application in the manner expected by the server-side application (e.g., via a TCP socket).

This "transcoding" therefore refers to the conversion from one protocol to another, i.e., between a browser-supported protocol and a non-browser supported protocol, thereby allowing a browser-based application to communicate with any other application even though the browser-based application cannot directly employ the non-browser supported protocol. The transcoder process can therefore be viewed as a specialized proxy for performing the transcoding.

Although this specification will primarily describe the invention as being used to allow a browser-based application to communicate with an RDP server (as the server-side application), the invention can equally be used to enable communication between a browser-based application and any server-side application that does not employ a browser-supported application layer protocol (including remote display protocols similar to RDP such as ICA as well as protocols used for purposes other than remote display). Also, although the invention will primarily be described as employing the WebSocket protocol between the browser-based application and the transcoder process, any other browser-supported protocol could be used including HTTP.

A server-side application should be construed broadly to encompass any application with which a browser-based application can communicate over the internet or other similar network. A browser should be construed to include desktop browsers, mobile browsers, and any other type of browser. Currently, a browser in accordance with embodiments of the present invention would typically be configured to execute browser-based applications that are written using JavaScript. However, the present invention should not be limited to operation with a browser-based application written in any particular programming language. A server should be construed broadly to encompass not only a single server device but also combinations of multiple server devices such as a cloud or cluster of server devices. A server should also be construed as encompassing gateway devices.

Figure 2:
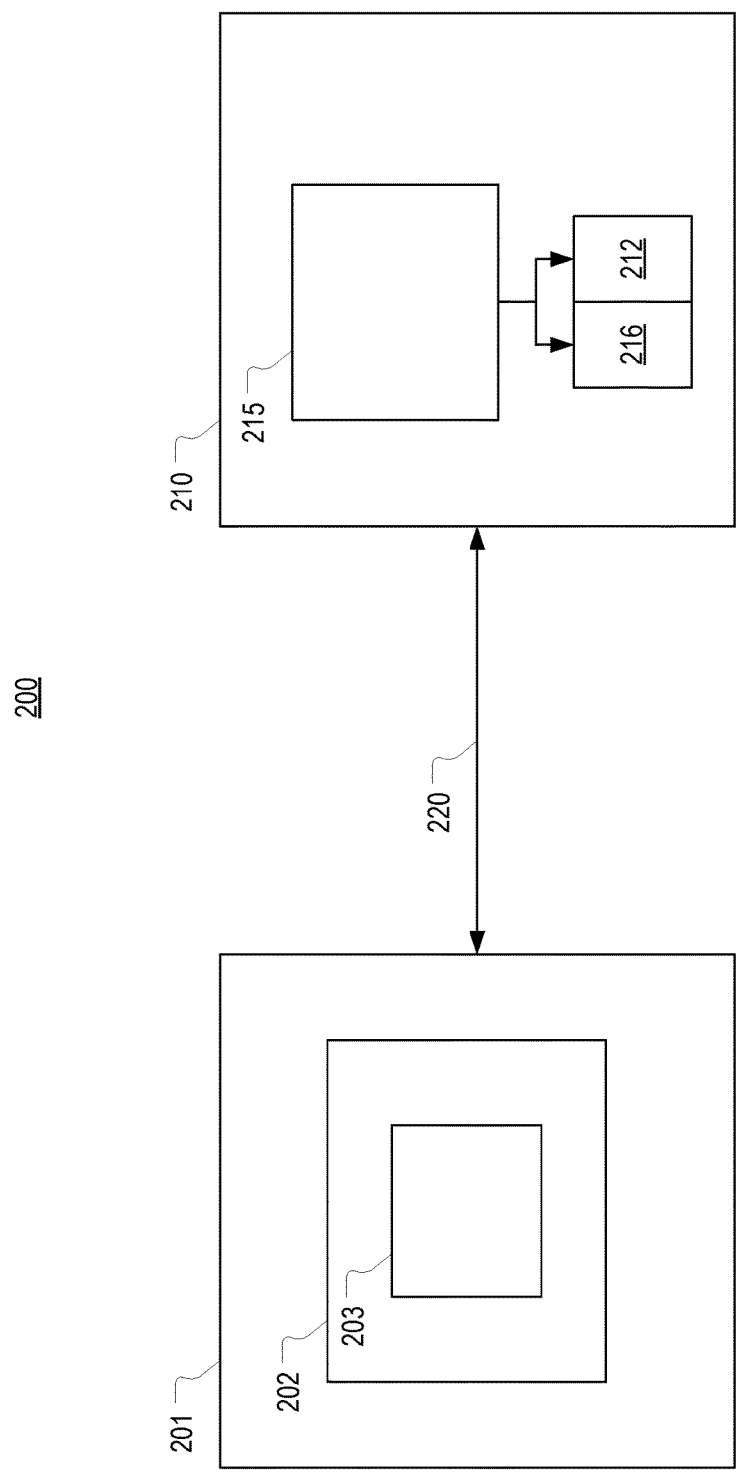
FIG. 2 illustrates a computing environment in accordance with embodiments of the present invention which allows a browser-based application to communicate with a server-side application using application layer protocols that are not supported by the browser.

FIG. 2 illustrates an example computing environment 200 that is configured in accordance with one or more embodiments of the present invention. As with computing environment 100, computing environment 200 includes a client device 201 (e.g., a desktop or laptop computer, a tablet, a thin client, a mobile phone, a television, or any other computing device capable of executing a browser 202) and a server 210 that are interconnected via an internet connection 220 or other similar network connection. Server 210 includes a generic client engine 215 which is configured to receive requests from browser-based application 203 via connection 220. In response to receiving a request from browser-based application 203 to access a server-side application 212, generic client engine 215 can associate or bind server-side application 212 with an instance of an appropriate transcoder process 216 that is configured to function as an intermediary between server-side application 212 and browser-based application 203.

Figure 3:
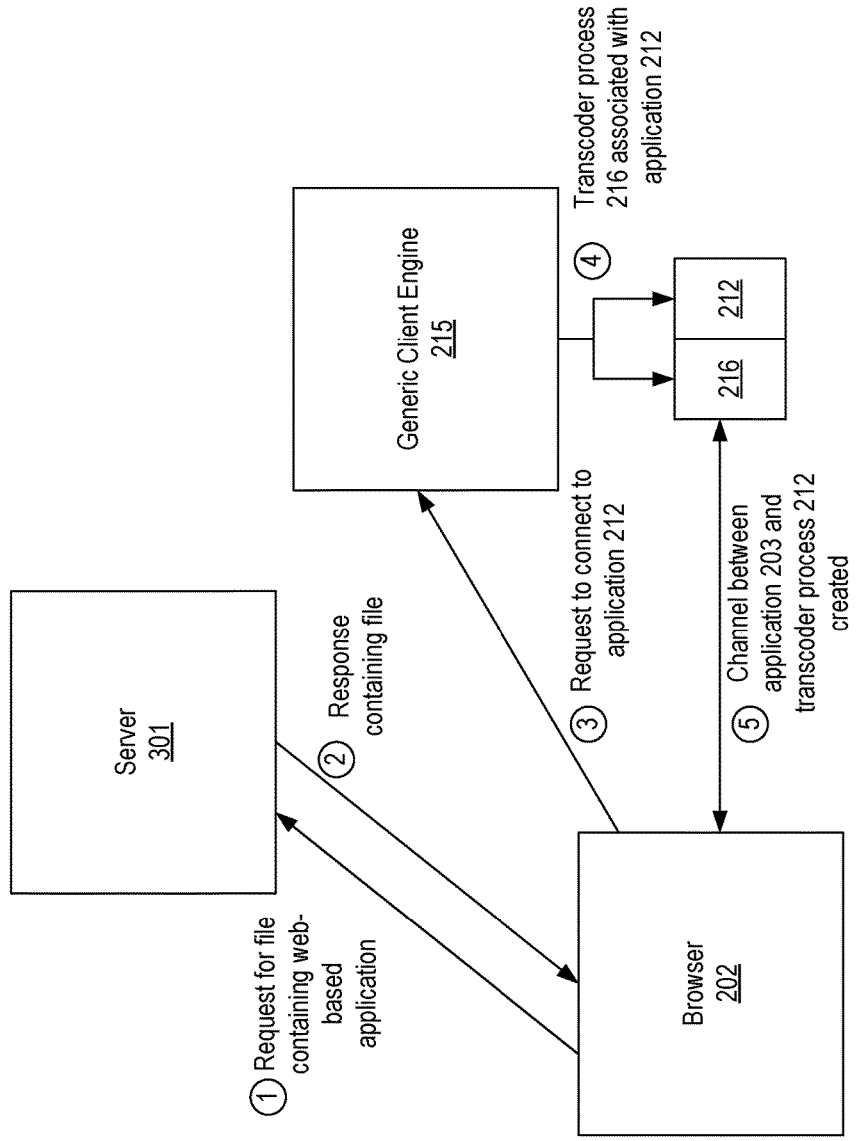
FIG. 3 illustrates an example process for creating a channel between a browser-based application and a transcoder process which can be used to communicate data formatted in accordance with an application layer protocol that the browser does not support.

FIG. 3 provides a flowchart illustrating an example of how this process can be carried out. In a first step, a request is sent to a server 301 to obtain a file (e.g., an HTML file) containing the browser-based application (e.g., a Javascript file). This can be accomplished in a standard way such as by submitting an HTTP GET request in response to a user entering a URL (e.g., https://rdpservice.company.com) into the browser. Although a separate server 301 is illustrated as receiving this request, the same server hosting generic client engine 215 (i.e., server 210) could receive this request depending on the particular configuration of the computing environment. Also, the browser-based application could be obtained from a different source such as from local storage.

In step 2, server 301 responds to the request by sending a response (e.g., an HTTP response) that includes a file containing the browser-based application. It is noted that steps 1 and 2 can represent typical internet communications. For example, after steps 1 and 2 have been executed, browser 202 may display a webpage to the user allowing the user to provide input identifying a server-side application that the user desires to access.

In accordance with embodiments of the present invention, the browser-based application obtained via steps 1 and 2 can be configured to communicate with generic client engine 215 in response to the user indicating a desire to access a server-side application. In particular, in step 3, it is assumed that browser 202 has executed browser-based application 203 which has caused a request (e.g., an "open" request) to be sent to generic client engine 215 (e.g., ws://hostsomewhere/path?<connection information>). This request can identify application 212 (e.g., the hostname and path to the application) and may include any information necessary for accessing application 212 (e.g., the connection information) such as a username and password which may have been input by the user into browser 202 or otherwise obtained. Some of the connection information included in the request may be passed to transcoder process 216 and/or to server-side application 212 as part of step 4 and/or step 5 described below. This request may be sent using any browser-enabled protocol such as HTTP, HTTPS, WebSocket, Secure WebSocket, etc. In a particular embodiment, the request in step 3 may be sent over a WebSocket endpoint that has been elevated from an HTTP endpoint.

In step 4 and in response to receiving the request in step 3, generic client engine 215 can associate (or bind) the requested application which in this case is server-side application 212 with an appropriate instance of transcoder process 216 (e.g., one that can communicate RDP data over HTTP, WebSocket, or another browser-supported protocol). In some cases, the process of associating transcoder process 216 with server-side application 212 may include first launching server-side application 212 and/or transcoder process 216. However, in other cases, server-side application 212 and/or transcoder process 216 may already be operating when the request in step 3 is received such that only the appropriate association needs to be established.

In step 5, and as part of associating or binding server-side application 212 with transcoder process 216, generic client engine 215 also establishes a communication channel between browser-based application 203 and transcoder process 216 that employs an appropriate browser-supported protocol. For example, as part of step 3, browser-based application 203 may create a WebSocket endpoint for transmitting data to and receiving data from server-side application 212. In some embodiments, as indicated above, this can be accomplished by elevating the HTTP endpoint used to obtain the javascript file (or an HTTP endpoint used to initially communicate with generic client engine 215) to a WebSocket endpoint. Generic client engine 215 can cause transcoder process 216 to use the corresponding WebSocket endpoint on the server side to form a WebSocket channel between browser-based application 203 and transcoder process 216. Alternatively, a channel could be created between browser-based application 203 and transcoder process 216 employing a different browser-supported protocol such as HTTP, FTP, WebRTC, etc.

Once the channel has been created between browser-based application 203 and transcoder process 216 in step 5, browser-based application 203 can commence sending data to and receiving data from server-side application 212 even though browser-based application 203 cannot employ the application layer protocol required by server-side application 212. To allow these communications, both browser-based application 203 and transcoder process 216 can be configured to transfer and receive data formatted in accordance with a first application layer protocol that is not supported by the browser using a second application layer protocol that is supported by the browser.

Figure 4:
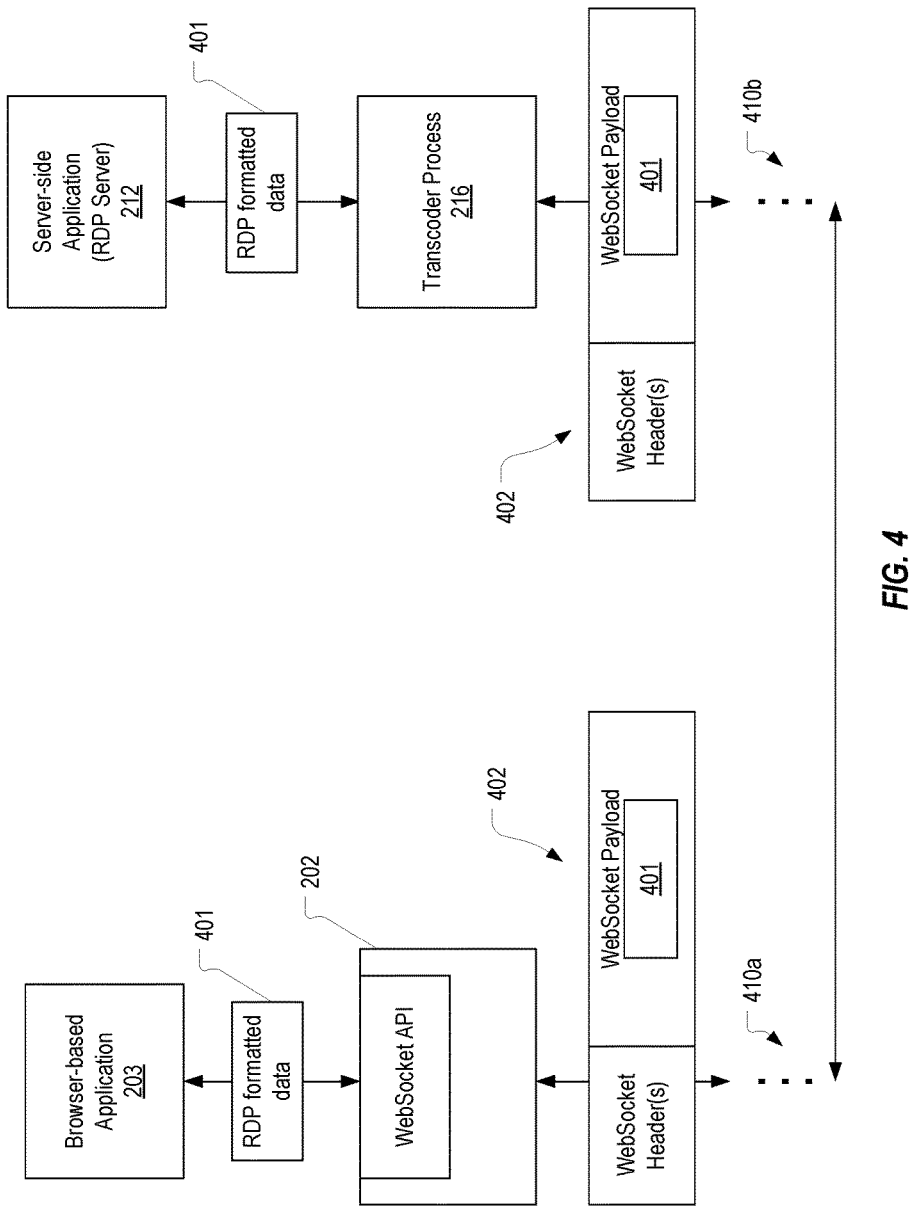
FIG. 4 illustrates an example of how a browser-based application and a transcoder process can be configured to employ a supported application layer protocol to communicate data formatted in accordance with a non-supported application layer protocol.

FIG. 4 illustrates an example of how this "transcoding" process can be accomplished. In FIG. 4, it is assumed that server-side application 212 is an RDP server that employs the remote desktop protocol as an application layer protocol for communicating with a client-side application. It will also be assumed that server-side application 212 employs a TCP socket for communicating the RDP data. In this example, the client-side application is browser-based application 203 that is limited to employing the application layer protocols supported by browser 202. In other words, since browser-based application 203 is executed by browser 202 within a sandbox, it can only communicate over the internet using the application layer protocol APIs (e.g., an HTTP API, a WebSocket API, etc.) provided by browser 202. In this example, it will be assumed that browser-based application 203 is configured to employ the WebSocket protocol.

Since browser 202 does not provide an RDP API and because browser-based application 203 cannot directly access a transport layer socket, without the present invention, browser-based application 203 would not be capable of communicating RDP formatted data to server-side application 212 (i.e., browser-based application 203 cannot write RDP formatted data to a TCP socket as is expected by server-side application 212). The present invention overcomes this by interposing transcoder process 216 between browser-based application 203 and server-side application 212. More particularly, as described above, generic client engine 215 can associate server-side application 212 with an appropriate transcoder process 216 to enable the browser-based application to communicate with the server-side application.

FIG. 4 represents the state of the environment after generic client engine 215 has associated server-side application 212 with transcoder process 216 and an appropriate channel has been created between browser-based application 203 and transcoder process 216. In this state, browser-based application 203 can send and receive RDP formatted data 401. To send RDP formatted data 401, browser-based application 203 can directly format the data into the appropriate RDP format and then submit this RDP formatted data 401 to the appropriate application layer protocol API, which, as noted above, is the WebSocket API in this example.

When browser 202 receives RDP formatted data 401 via appropriate WebSocket API function calls, it will package the data into the payload of one or more WebSocket packets 402. These packets would then be passed down through the lower layers 410a of the protocol stack (e.g., the transport, internet, and link layers) and transmitted to server 210 where they will be passed up through the corresponding lower layers 410b as is standard in the art. As a result, transcoder process 216 will receive the one or more WebSocket packets 402 that contain RDP formatted data 401 in the payload. Transcoder process 216 can then extract RDP formatted data 401 from the payload and provide it to server-side application 212. When server-side application 212 generates RDP formatted data 401 and sends the RDP formatted data 401 via a TCP socket, the same process can be performed in reverse so that RDP formatted data 401 will be sent to browser-based application 203 within WebSocket packets 402.

It is again noted that the example in FIG. 4 is merely a generalized example representing how transcoder process 216 can function as an intermediary. The particular manner in which transcoder process 216 performs transcoding will vary based on how server-side application 212 is configured to communicate over a network. For example, transcoder process 216 may be configured to intercept server-side application 212's function calls to operating-system-provided transport layer APIs. In this case, if server-side application 212 is configured to employ RDP as the application layer protocol, it can be configured to read and write RDP formatted data to a transport layer socket (e.g., a TCP socket). Transcoder process 216 may be configured to intercept these read and write functions to allow transcoder process 216 to encapsulate the RDP formatted data within or extract the RDP formatted data from the payload of packets of a second application layer protocol that is supported by browser 202. In this way, server-side application 212 can communicate via a transport layer socket as it is configured to do, while transcoder process 216 transparently performs the transcoding between the incompatible application layer protocols.

Figure 5:
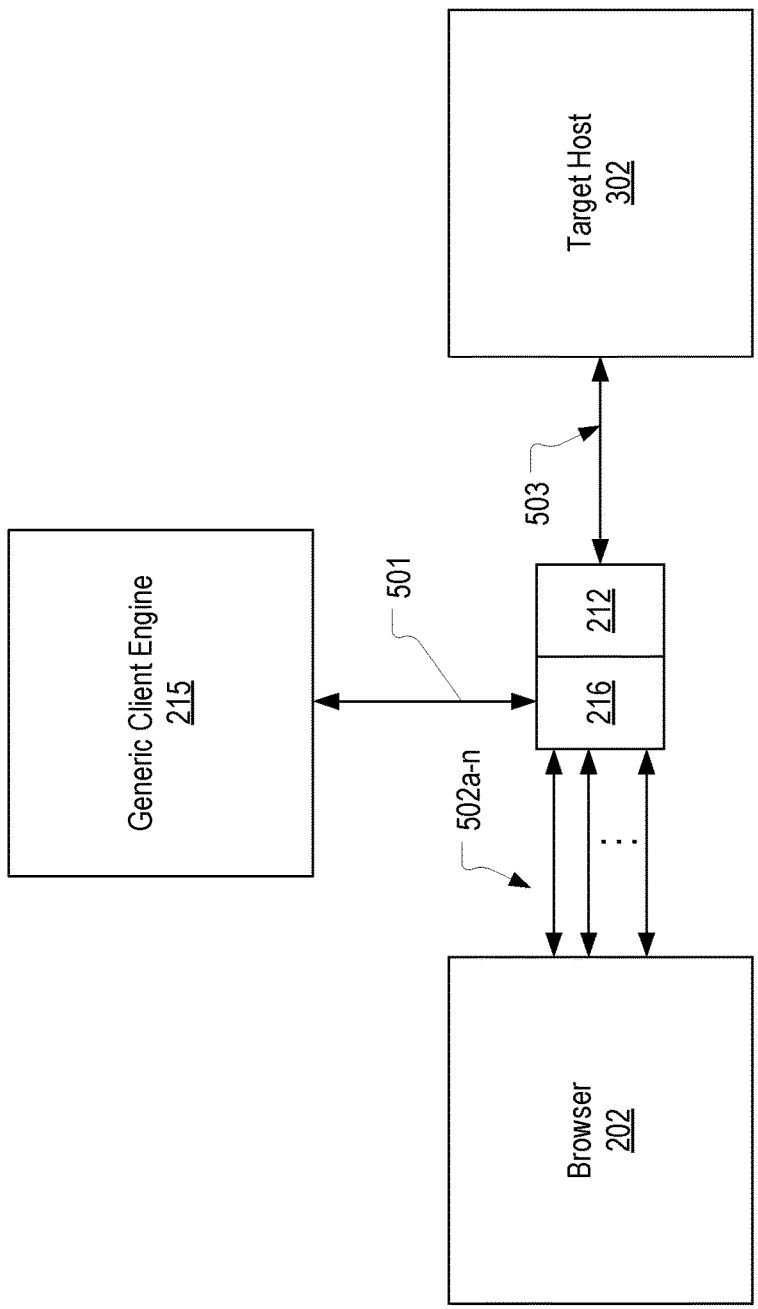
FIG. 5 illustrates how additional channels can be created between a browser-based application and a transcoder process.

In the description above, the channel created between browser 202 and transcoder process 216 can be referred to as a main channel. In some embodiments, it may be desirable to create additional channels (e.g., virtual channels) between browser 202 and transcoder process 216 that are associated with this main channel. FIG. 5 illustrates how this can be accomplished in an environment where server-side application 212 is an RDP server that communicates with a target host over a channel 503.

In FIG. 5, a number of channels 502a-502n are shown as existing between browser 202 and transcoder process 216. A first of these channels, channel 502a, can be viewed as the main channel which is established as described with reference to FIG. 3. To facilitate the creation of additional channels 502b-502n between browser 202 and transcoder process 216, generic client engine 215 may retain a control channel 501 with transcoder process 216. Additional channels 502b-502n may be created for various reasons. For example, as shown in FIG. 5, if server-side application 212 is an RDP server which communicates with target host 302, RDP server 212 may request that a virtual channel be created to transmit data (e.g., audio data or clipboard data) between RDP server 212 and browser-based application 203.

In such cases, transcoder process 216 can transmit a request to create a virtual channel to browser-based application 203 via main channel 502a as described above (e.g., by including the appropriate RDP formatted request within the payload of a WebSocket packet). This request can include an identifier and any information necessary for browser-based application 203 to create the virtual channel (e.g., a protocol to use, a URL for submitting the request to generic client engine 215, client-side endpoint parameters (e.g., iFrame parameters), etc.). In response to receiving this request over main channel 502a, browser-based application 203 can submit an "open" request to generic client engine 215 (e.g., in a manner similar to step 3 of FIG. 3) requesting that a virtual channel be created. This open request can include the identifier and employ any necessary information provided by transcoder process 216.

Generic client engine 215 can then employ control channel 501 to validate the open request (e.g., to ensure that browser-based application 203 is not attempting to unilaterally open a channel). This can be accomplished, for example, by employing the identifier submitted by browser-based application 203 in the open request to verify that it matches the identifier that transcoder process 216 instructed browser-based application 203 to use. If it is determined that transcoder process 216 directed the request for the new channel (which in this example would imply that RDP server 212 directed the request), generic client engine 215 will cause the creation of a virtual channel (e.g., additional channel 502b) between browser 202 and transcoder process 216 using a unique socket. This virtual channel can be employed in a similar manner as described above to transport data between browser-based application 203 and server-side application 212 including to employ transcoder process 216 to transcode the data. Any number of additional channels can be created in this manner and related to main channel 502a.

It is important to note that each additional channel 502b-502n is related to main channel 502a but is a separate channel. For example, each of channels 502a-502n can employ a different transport layer socket on client device 201. In spite of the different sockets being used, transcoder process 216 will still be able to send data to and receive data from browser-based application 203 as described above. This data can be provided to or received from server-side application 212 in the manner expected by server-side application 212 so that the transcoding process remains transparent. It is further noted that although FIG. 5 employs an example where the creation of additional channel 502b is performed in response to a request from RDP server 212, a similar process can be employed to create additional channels when server-side application 212 is not an RDP server.

In the above examples, the transcoder process has been described as being bound directly to the server-side application. However, in some embodiments, a transcoder process may be bound to a library (either directly or via a framework) which is used to interface with the instance of the server-side application. The library can be configured to intercept the server-side application's system calls to implement the transcoding process described above. Employing a library in this manner can facilitate application exporting.

In some embodiments, the above described features of the present invention may be implemented in conjunction with load balancing techniques. For example, in a cloud-based implementation, generic client engine 215 can associate a requested server-side application and the accompanying transcoder process in a number of available execution hosts. The selection of a particular host can be based on load balancing considerations.

However, in such cases, the use of a single generic client engine 215 would increase the likelihood of the system becoming unavailable since all requests to access server-side applications would be routed through the single generic client engine. Therefore, in some embodiments, the present invention may employ a number of generic client engine instances (each of which may be executed within a unique host environment) and a proxy to control which requests are routed to each instance of the generic client engine.

Figure 6:
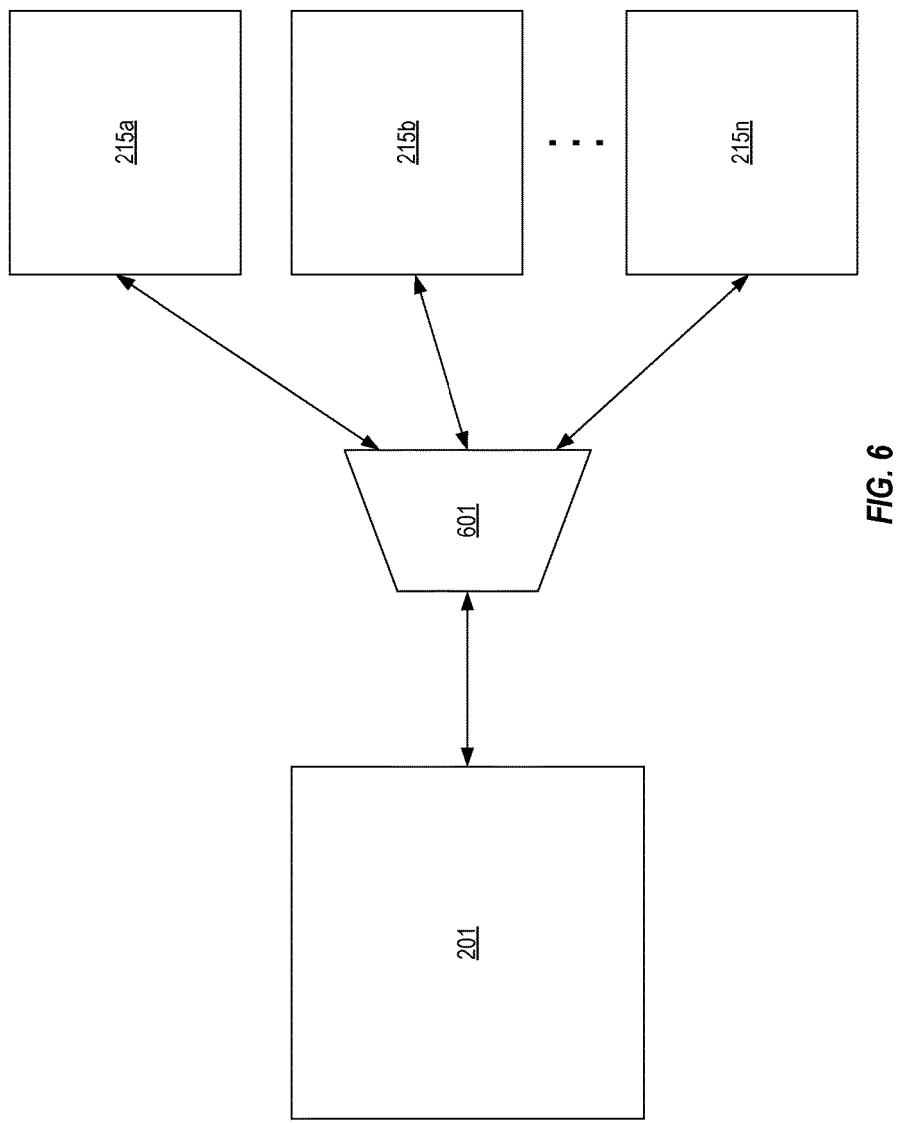
FIG. 6 illustrates how a proxy can be employed within the present invention to provide load balancing and high availability.

FIG. 6 illustrates an example of an embodiment that employs a proxy 601. In such embodiments, the process depicted in FIG. 3 would be carried out in much the same manner except that proxy 601 would route the initial request to a particular instance 215a-215n of the generic client engine based on load balancing criteria such as, for example, which host has the fewest number of connections. Once a particular instance of the generic client engine is selected, a channel is established between the browser-based application and the transcoder process as described above thereby bypassing proxy 601 for future communications.

Additionally, in embodiments that employ proxy 601, considerations must be made for the creation of additional channels once a main channel between a browser-based application and a particular instance of a transcoder process has been established. In particular, if the browser-based application requests a virtual channel, the system can be configured to ensure that the request is provided to the instance of the generic client engine that is managing the corresponding main channel. This can be accomplished by configuring the transcoder process to include an identifier (e.g., a URL) that uniquely identifies the instance of the generic client engine that created the transcoder process. This identifier can then be employed by the browser-based application when sending an open request for creating an additional channel as described above so that the open request is routed to the corresponding instance of the generic client engine. As described above, the instance of the generic client engine can employ the identifier (or a separate identifier included in the request) to create an additional channel between the browser-based application and the appropriate transcoder process. In this way, each additional channel (e.g., each virtual channel) will be created with the same instance of the transcoder process with which the main channel is created.

To the point, embodiments of the present invention have been described where server-side application 212 and transcoder process 216 are both hosted on server 210. However, the present invention also extends to embodiments where transcoder process 216 is hosted on a device that functions as a gateway to a server on which server-side application 212 is hosted.

Figure 7:
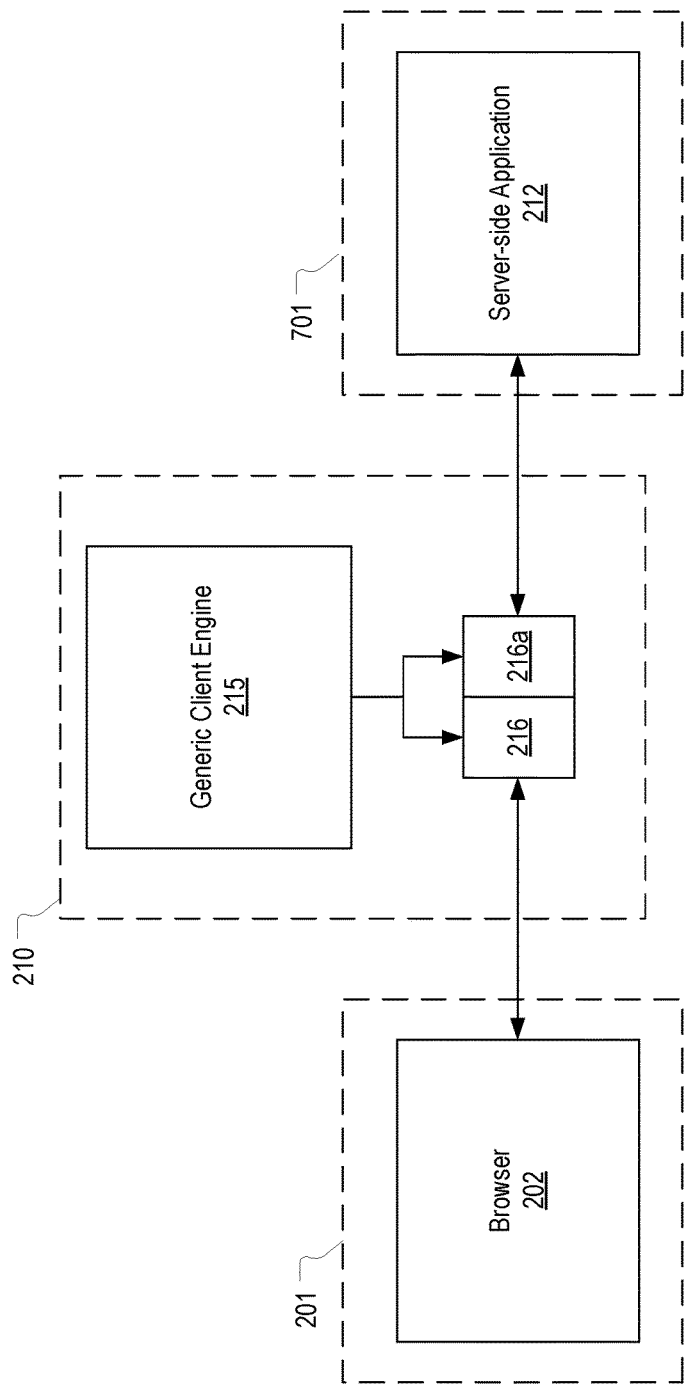
FIG. 7 illustrates how a transcoder process can act as an intermediary between a browser-based application and a server-side application when a gateway service provides access to the server-side application.

FIG. 7 illustrates an example of this configuration. FIG. 7 is similar to FIG. 2 except that generic client engine 215 and transcoder process 216 are hosted on server 210 (which in this example functions as a gateway) while server-side application 212 is hosted on server 701. In such cases, server 701 would typically be positioned behind a firewall and server 210 would function as a gateway to allow client device 201 to access server 701.

In this configuration, generic client engine 215 and transcoder process 216 function in substantially the same manner as described above. In particular, steps 3 through 5 of FIG. 3 would still be implemented to create an association between transcoder process 216 and server-side application 212 (e.g., based on parameters specified in the request in step 3 such as a hostname, IP address, username, password, etc. for server-side application 212) and to create a channel between browser-based application 203 and transcoder process 212.

An important distinction between the configurations in FIGS. 3 and 7 is that, in FIG. 7, transcoder process 216 is bound to or incorporates a VPN, gateway, or tunneling service 216a (hereinafter "gateway service 216a"). In this example, gateway service 216a can be configured to perform VPN functionality as is known in the art to allow network communications to be transmitted between client device 201 and server 701.

Transcoder process 216 can function as an intermediary as described above to transcode between a non-browser-supported protocol employed by server-side application 212 and a browser-supported protocol. However, in these embodiments, transcoder process 216 can additionally perform a transcode between the browser-supported protocol and the VPN, gateway, or tunneling protocol (hereinafter gateway protocol) employed by gateway service 216a.

More specifically, because browser-based application 203 is limited to using the browser-supported protocols, it is not possible for browser-based application 203 to implement the necessary gateway protocol for communicating with server-side application 212 via gateway service 216a. Therefore, when browser-based application 203 requests access to server-side application 212, generic client engine 215 can associate an instance of transcoder process 216 that is configured to not only transcode between the non-browser-supported and browser-supported application layer protocols, but can also transcode between the browser-supported protocol and the gateway protocol.

Figure 8:
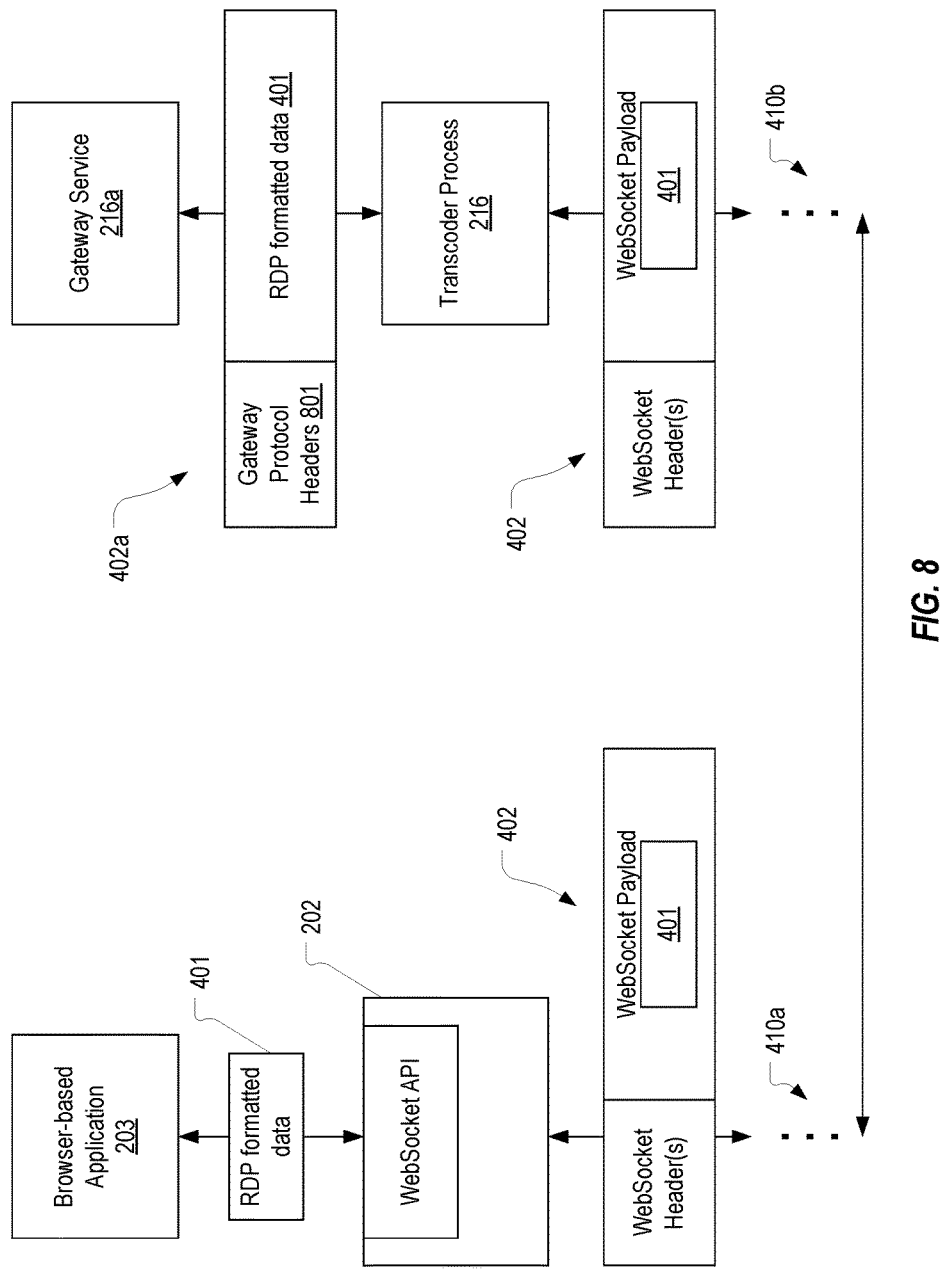
FIG. 8 illustrates an example of how a browser-based application and a transcoder process can be configured to employ a supported application layer protocol to communicate data formatted in accordance with a non-supported application layer protocol via a gateway service.

FIG. 8, which is based on FIG. 4, provides an example of the transcoding process when gateway service 216a is involved. As shown, transcoder process 216 receives WebSocket packets 402 in the same manner as described above with reference to FIG. 4. However, in this case, transcoder process 216 is not directly bound to server-side application 212 (i.e., they are not operating on the same host), but is directly bound to or incorporated with gateway service 216a. Accordingly, transcoder process 216 transcodes WebSocket packets 402 into the format expected by gateway service 216a. As a simplified example, this is shown as transcoder process 216 providing packets 402a (e.g., via a transport layer socket or an API at another level of the protocol stack) that include RDP formatted data 401 in the payload and appropriate gateway protocol headers 801. Gateway service 216a would then receive packets 402a and process them in a standard manner as if they had been directly sent by a client-side application. In other words, gateway service 216a would forward packets containing RDP formatted data 401 (which has been transcoded from WebSocket formatted data) to server-side application 212 based on gateway protocol headers 801.

Accordingly, in embodiments that include a gateway service, transcoder process 216 can be configured to transcode packets into the format expected by the gateway service while also transcoding the payload of such packets into the format expected by the server-side application to which the gateway service will forward the packets. In this way, a browser-based application can be configured to communicate with a server-side application behind a firewall even though the browser-based application cannot directly implement the application layer protocol required by the server-side application or the gateway protocol required by the gateway service.

The present invention also extends to embodiments where both gateway service 216a and transcoder process 216 or only transcoder process 216 may be located at the client side, e.g., on client device 201. In such cases, these components can function in much the same manner as described above, except that transcoder process 216 will be configured to bind to browser-based application 203 such that it may intercept communications from browser-based application 203. In particular, the same processing depicted in FIGS. 4 and 8 would occur except that transcoder process 216 (and, in some cases, gateway service 216a) would process packets 402 on client device 201 (i.e., prior to packets 402 being passed down through the lower layers 410a and transmitted over a network). In such cases, transcoder process 216, or gateway service 216a when it is located on client device 201, would transmit appropriately formatted communications over the network to the appropriate server-side application.

Figure 9:
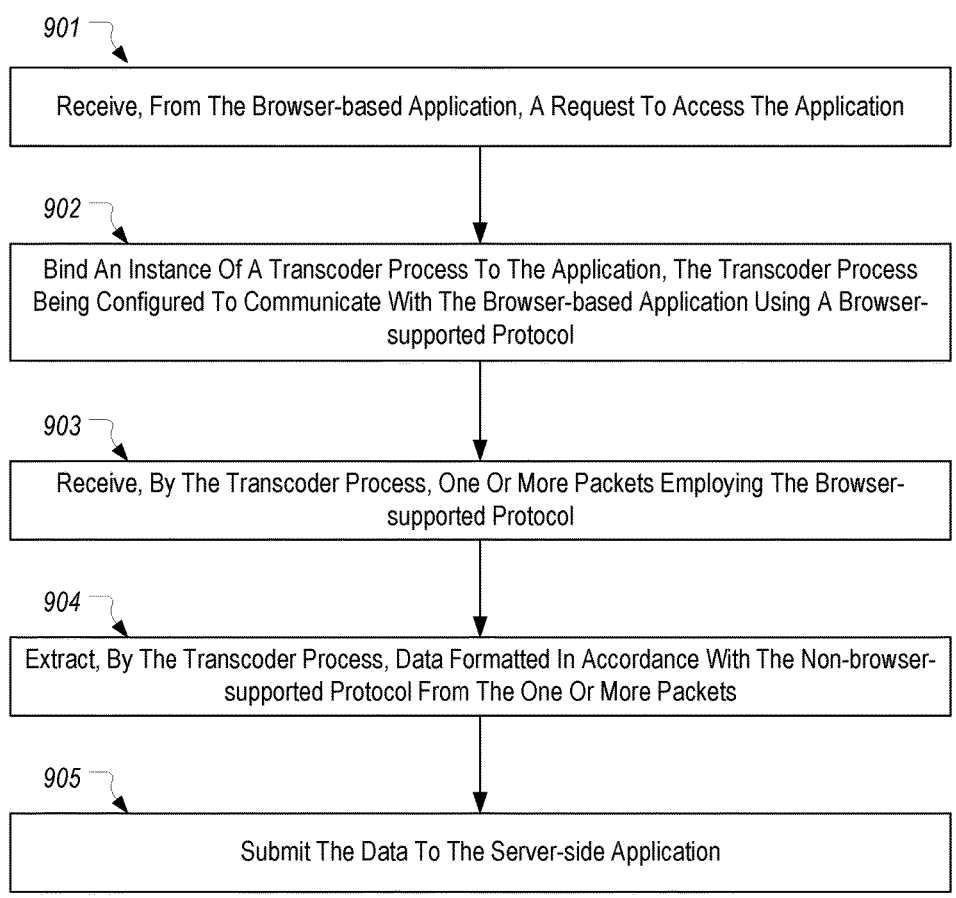
FIG. 9 illustrates a flowchart of an example method for enabling a browser-based application to employ a non-browser-supported protocol to communicate with an application.

FIG. 9 provides a flowchart of an example server-implemented method 900 for enabling a browser-based application to employ a non-browser-supported protocol to communicate with an application hosted on the server. Method 900 will be described with reference FIGS. 2-4.

Method 900 includes an act 901 of receiving, from the browser-based application, a request to access the application. For example, generic client engine 215 can receive a request from browser-based application 203 to access a server-side application such as server-side application 212.

Method 900 includes an act 902 of binding an instance of a transcoder process to the application, the transcoder process being configured to communicate with the browser-based application using a browser-supported protocol. For example, generic client engine 215 can bind transcoder process 216 and server-side application 212 and cause transcoder process 216 to communicate with browser-based application 203 using a browser-supported protocol such as WebSocket. In some embodiments, this binding can include allowing transcoder process 216 to interface with a transport layer socket employed by server-side application 212.

Method 900 includes an act 903 of receiving, by the transcoder process, one or more packets employing the browser-supported protocol. For example, transcoder process 216 may receive packets using the WebSocket or other browser-supported protocol from browser-based application 203 that are intended for server-side application 212.

Method 900 includes an act 904 of extracting, by the transcoder process, data formatted in accordance with the non-browser-supported protocol from the one or more packets. For example, the packets received from browser-based application 203 may include data formatted in accordance with RDP or another non-browser-supported protocol which transcoder process 216 may extract.

Method 900 includes an act 905 of submitting the data to the server-side application. For example, transcoder process 216 can submit data to server-side application 212 in a manner expected by server-side application 212. In some embodiments, this data can be submitted via a transport layer socket.

In some embodiments, method 900 can include additional acts of receiving, by the transcoder process, second data from the server-side application; generating second one or more packets in accordance with the browser-supported protocol and including the second data within the second one or more packets, the second data being formatted in accordance with the non-browser-supported protocol; and sending the second one or more packets to the browser-based application. For example, this second data, when received from server-side application 212, can be formatted in accordance with a non-browser-supported protocol (e.g., by intercepting function calls to a transport layer API).

Figure 10:
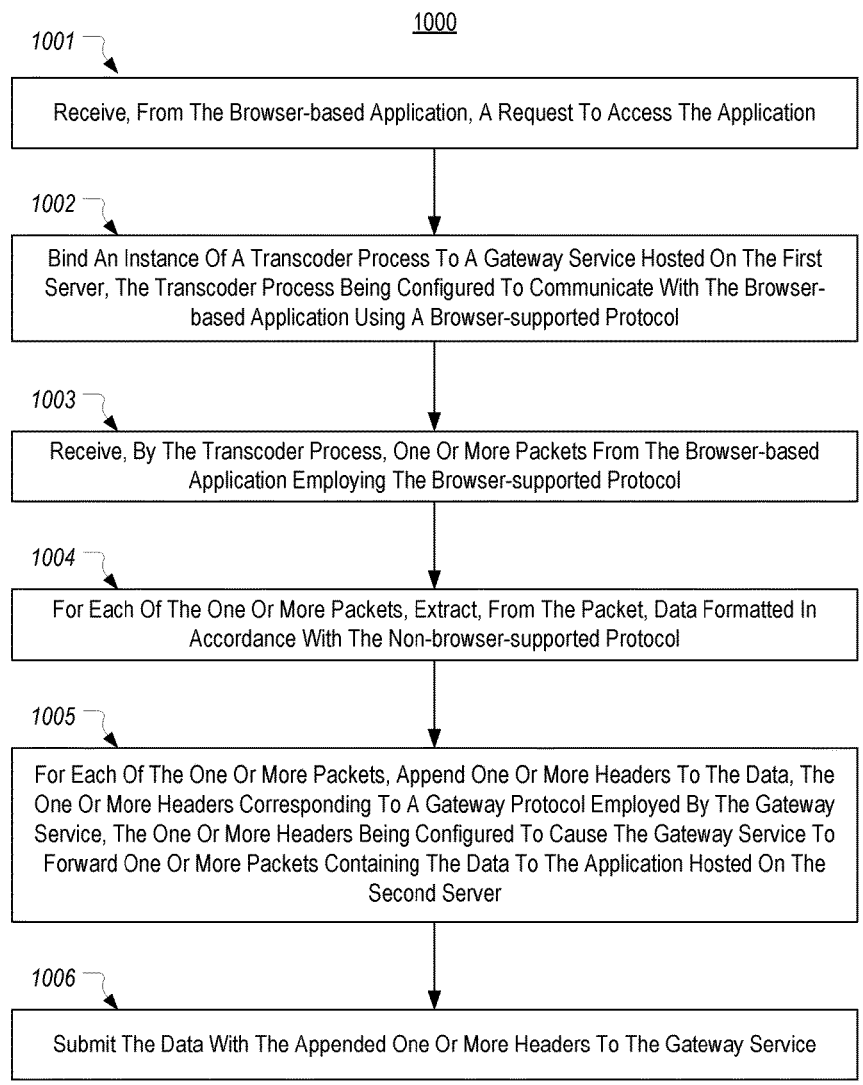
FIG. 10 illustrates a flowchart of an example method implemented by a first server for enabling a browser-based application to employ a non-browser-supported protocol to communicate with an application hosted on a second server for which the first server functions as a gateway.

FIG. 10 provides a flowchart of an example method 1000 implemented by a first server for enabling a browser-based application to employ a non-browser-supported protocol to communicate with an application hosted on a second server for which the first server functions as a gateway. Method 1000 will be described primarily with reference to FIGS. 2, 3, 7, and 8.

Method 1000 includes an act 1001 of receiving, from the browser-based application, a request to access the application. For example, generic client engine 215 which is hosted on server 210 can receive a request from browser-based application 203 to access server-side application 212 which is hosted on server 701.

Method 1000 includes an act 1002 of binding an instance of a transcoder process to a gateway service hosted on the first server, the transcoder process being configured to communicate with the browser-based application using a browser-supported protocol. For example, generic client engine 215 can bind transcoder process 216 with gateway service 216a.

Method 1000 includes an act 1003 of receiving, by the transcoder process and from the browser-based application, one or more packets employing the browser-supported protocol. For example, transcoder process 216 may receive packets using the WebSocket or other browser-supported protocol from browser-based application 203 that are intended for server-side application 212.

Method 1000 includes an act 1004 of, for each of the one or more packets, extracting, from the packet, data formatted in accordance with the non-browser-supported protocol. For example, the packets received from browser-based application 203 may include data formatted in accordance with RDP or another non-browser-supported protocol which transcoder process 216 may extract.

Method 1000 includes an act 1005 of, for each of the one or more packets, appending one or more headers to the data, the one or more headers corresponding to a gateway protocol employed by the gateway service, the one or more headers being configured to cause the gateway service to forward one or more packets containing the data to the application hosted on the second server. For example, transcoder process 216 can create an appropriate VPN protocol "packet" that includes appropriate VPN headers and RDP formatted data in its payload.

Method 1000 includes an act 1006 of, for each of the one or more packets, submitting the data with the appended one or more headers to the gateway service. For example, transcoder process 216 can submit the appropriately formatted VPN protocol packet to gateway service 216a such that it will appear to gateway service 216a as if client device 201 had formatted and sent the packet.

In summary, the present invention facilitates the creation of browser-based applications that can communicate using non-browser-supported protocols. The transcoder process can be utilized to perform any necessary transcoding of data transferred between the server-side application and the browser-based application including in environments where a gateway service provides access to the server-side application.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a server, of enabling a browser-based application that is executed within a browser on a client device to employ a non-browser-supported application layer protocol to communicate with an application hosted on the server, the method comprising:

receiving, from the browser-based application that is executed within a browser on a client device and is therefore limited to using browser-supported application layer protocols to communicate over a network, a request to access the application hosted on the server;

binding an instance of a transcoder process to the application hosted on the server, the transcoder process being configured to communicate with the browser-based application that is executed within the browser on the client device using a browser-supported application layer protocol;

receiving, by the transcoder process, one or more packets sent by the browser-based application using the browser-supported application layer protocol, the one or more packets encapsulating data that the browser-based application formatted in accordance with the non-browser supported application layer protocol;

extracting, by the transcoder process, the data formatted in accordance with the non-browser-supported application layer protocol from the one or more packets that were sent by the browser-based application that is executed within the browser on the client device and received by the transcoder process using the browser-supported application layer protocol; and submitting the data formatted in accordance with the non-browser-supported application layer protocol to the application hosted on the server.

2. The method of claim 1, wherein submitting the data to the application comprises intercepting one or more function calls made by the application to an operating-system provided transport layer API.

3. The method of claim 1, wherein the data is submitted to the application via a transport layer socket.

4. The method of claim 1, further comprising:
receiving, by the transcoder process, second data from the application hosted on the server, the second data being formatted in accordance with the non-browser-supported application layer protocol;
generating second one or more packets in accordance with the browser-supported application layer protocol and including the second data within the second one or more packets; and
sending the second one or more packets to the browser-based application that is executed within the browser on the client device.

5. The method of claim 4, wherein receiving the second data comprises intercepting one or more function calls made by the application to an operating-system provided transport layer API.

6. The method of claim 4, wherein the second data is received from the application via a transport layer socket.

7. The method of claim 1, wherein the non-browser-supported application layer protocol is a remote display protocol.

8. The method of claim 7, wherein the application is an RDP server and the browser-based application is an RDP client.

9. The method of claim 7, wherein the second data comprises display data.

10. The method of claim 1, wherein the browser-supported application layer protocol is the WebSocket protocol.

11. The method of claim 1, wherein the transcoder process is configured to communicate with the browser-based application over a main channel and one or more additional channels that are related to the main channel.

12. The method of claim 1, wherein the request to access the application is received via a proxy.

13. A method, implemented by a first server, of enabling a browser-based application that is executed within a browser on a client device to employ a non-browser-supported application layer protocol to communicate with an application hosted on a second server for which the first server functions as a gateway, the method comprising:
receiving, from the browser-based application that is executed within a browser on a client device and is therefore limited to using browser-supported application layer protocols to communicate over a network, a request to access the application hosted on the second server;

binding an instance of a transcoder process to a gateway service hosted on the first server, the transcoder process being configured to communicate with the browser-based application that is executed within the browser on the client device using a browser-supported application layer protocol;

receiving, by the transcoder process and from the browser-based application, one or more packets sent by the browser-based application using the browser-supported application layer protocol, the one or more packets encapsulating data that the browser-based application formatted in accordance with the non-browser supported application layer protocol;

for each of the one or more packets:
extracting, from the packet that was sent by the browser-based application that is executed within the browser on the client device and received by the transcoder process using the browser-supported application layer protocol, the data formatted in accordance with the non-browser-supported application layer protocol;
appending one or more headers to the data, the one or more headers corresponding to a gateway protocol employed by the gateway service, the one or more headers being configured to cause the gateway service to forward one or more packets containing the data to the application hosted on the second server; and
submitting the data with the appended one or more headers to the gateway service.

14. The method of claim 13, further comprising:
receiving, by the transcoder process and from the gateway service, one or more packets that are formatted in accordance with the gateway protocol and that include in their payload data formatted in accordance with the non-browser-supported application layer protocol;
extracting the data from the one or more packets;
generating second one or more packets in accordance with the browser-supported application layer protocol and including the data within the second one or more packets; and
sending the second one or more packets to the browser-based application that is executed within the browser on the client device.

15. The method of claim 14, wherein the one or more packets are received from the gateway service via a transport layer socket.

16. The method of claim 13, wherein the data with the appended one or more headers is submitted to the gateway service via a transport layer socket.

17. The method of claim 13, wherein the browser-supported application layer protocol is the WebSocket protocol.

18. The method of claim 13, wherein the transcoder process appends the one or more headers based on information contained in the browser-based application's request to access the application.

19. One or more computer storage media storing computer-executable instructions which when executed in a server environment implement a method for enabling a browser-based application that is executed within a browser on a client device to communicate with a remote display server that employs a remote display protocol for communicating over a network, the method comprising:

receiving, from the browser-based application that is executed within a browser on a client device and is therefore limited to using browser-supported application layer protocols to communicate over a network, a request to access the remote display server;

in response to the request, binding an instance of a transcoder process to the remote display server, the transcoder process being configured to communicate with the browser-based application that is executed within the browser on the client device using a browser-supported application layer protocol;

receiving, by the instance of the transcoder process and from the browser-based application, one or more packets sent by the browser-based application using the browser-supported application layer protocol, the one or more packets encapsulating data that the browser-based application formatted in accordance with remote display protocol;

extracting, by the instance of the transcoder process, the data formatted in accordance with the remote display protocol from the one or more packets that were sent by the browser-based application that is executed within the browser on the client device and received by the transcoder process using the browser-supported application layer protocol;

submitting the data formatted in accordance with the remote display protocol to the remote display server;

receiving, by the instance of the transcoder process and from the remote display server, data formatted in accordance with the remote display protocol;

creating one or more packets formatted in accordance with the browser-supported application layer protocol and including the data formatted in accordance with the remote display protocol within the one or more packets; and sending the one or more packets formatted in accordance with the browser-supported application layer protocol to the browser-based application that is executed within the browser on the client device.

* * * * *